(12) United States Patent
Aramaki et al.

(10) Patent No.: US 11,217,367 B2
(45) Date of Patent: Jan. 4, 2022

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Mie (JP); Yasuo Omori, Mie (JP)

(73) Assignees: AUTONETWORKS TECHNOLOGIES, LTD., Mie (JP); SUMITOMO WIRING SYSTEMS. LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/263,699

(22) PCT Filed: Jul. 16, 2019

(86) PCT No.: PCT/JP2019/027856
§ 371 (c)(1),
(2) Date: Jan. 27, 2021

(87) PCT Pub. No.: WO2020/026782
PCT Pub. Date: Feb. 6, 2020

(65) Prior Publication Data
US 2021/0225556 A1   Jul. 22, 2021

(30) Foreign Application Priority Data
Aug. 3, 2018  (JP) .............................. JP2018-146618

(51) Int. Cl.
*H01B 7/08*   (2006.01)
*H02G 3/30*   (2006.01)

(52) U.S. Cl.
CPC ................................ *H01B 7/0846* (2013.01)

(58) Field of Classification Search
CPC .. B60R 16/0215; B60R 16/0207; H02G 3/30; H01B 7/0846
See application file for complete search history.

(56) References Cited

U.S. PATENT DOCUMENTS 4,761,517 A * 8/1988 Massit .................. F17C 13/008
                                                       174/117 FF
5,952,616 A * 9/1999 Morrow ............... H05K 5/0247
                                                       174/135

(Continued)

FOREIGN PATENT DOCUMENTS

| JP | 58-192408 | 12/1983 |
|----|-----------|---------|
| JP | 8-315641  | 11/1996 |

(Continued)

OTHER PUBLICATIONS

International Search Report in International Patent Application No. PCT/JP2019/027856, dated Sep. 17, 2019.

(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A wiring member includes a sheet material and a wire-like transmission member extending in a plane direction of the sheet material and fixed to the sheet material by a contact area direct fixation at intervals in three or more positions in a longitudinal direction of the wire-like transmission member. When an interval between two contact area direct fixation positions continuous in a longitudinal direction of the wire-like transmission member in contact area direct fixation positions of the sheet material and the wire-like transmission member is a fixation interval, the wiring member includes portions that differ in the fixation interval.

4 Claims, 3 Drawing Sheets

(56) References Cited

U.S. PATENT DOCUMENTS

| | | | |
|---|---|---|---|
| 6,225,561 B1* | 5/2001 | Mori | B60R 16/0207 |
| | | | 174/135 |
| 2020/0130613 A1* | 4/2020 | Kisu | H01B 13/01263 |
| 2020/0265973 A1* | 8/2020 | Martinez | H01B 7/0045 |

FOREIGN PATENT DOCUMENTS

| | | |
|---|---|---|
| JP | 11-308740 | 11/1999 |
| JP | 11-308741 | 11/1999 |

OTHER PUBLICATIONS

Written Opinion issued in International Patent Application No. PCT/JP2019/027856, dated Sep. 17, 2019.
International Preliminary Report on Patentability issued in International Patent Application No. PCT/JP2019/027856, dated Jul. 23, 2020.
Japan Official Action issued in Japan Patent Application No. 2018-146618, dated Jul. 20, 2021, together with English translation thereof.

* cited by examiner

WIRING MEMBER

TECHNICAL FIELD

The present disclosure relates to a wiring member.

BACKGROUND ART

Patent Document 1 discloses a technique of fixing a portion extending straight in a covering wire and a reinforcement material to a band-like body made of soft synthetic resin by heating-pressurizing welding to manufacture a wire harness.

PRIOR ART DOCUMENTS

Patent Documents

Patent Document 1: Japanese Utility Application Laid-Open No. 58-192408

SUMMARY

Problem to be Solved by the Invention

However, Patent Document 1 does not describe a specific range for a welding range of the band-like body and the covering wire, and does not also describe that a fixing strength is changed in each portion of the band-like body and the covering wire.

Therefore, it is an object to provide a technique capable of easily obtaining an appropriate fixing strength in each portion between a sheet material and a wire-like transmission member in a wiring member in which the sheet material and the wire-like transmission member are fixed by a contact area direct fixation.

Means to Solve the Problem

A wiring member according to the present disclosure is a wiring member including: a sheet material; and a wire-like transmission member extending on the sheet material and fixed to the sheet material by a contact area direct fixation at intervals in three or more positions in a longitudinal direction of the wire-like transmission member, wherein when an interval between two contact area direct fixation positions continuous in a longitudinal direction of the wire-like transmission member in contact area direct fixation positions of the sheet material and the wire-like transmission member is a fixation interval, the wiring member includes portions that differ in the fixation interval.

Effects of the Invention

According to the present disclosure, an appropriate fixing strength can be obtained easily in each portion between a sheet material and a wire-like transmission member in a wiring member in which the sheet material and the wire-like transmission member are fixed by a contact area direct fixation.

DESCRIPTION OF EMBODIMENT(S)

Description of Embodiment of Present Disclosure

Figure 1:
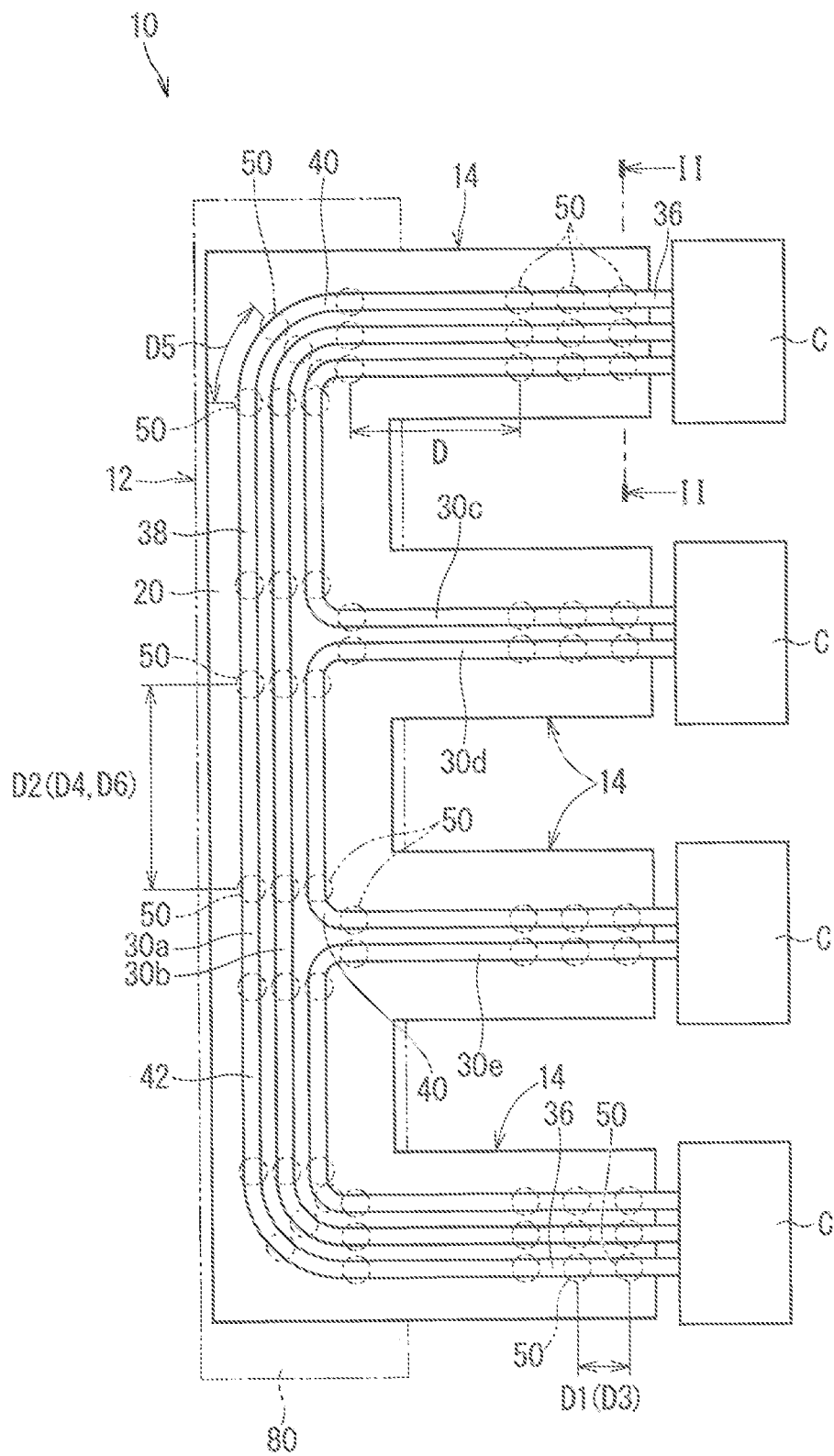
FIG. 1 is a plan view illustrating a wiring member according to a first embodiment.

Embodiments of the present disclosure are listed and described firstly.

A wiring member according to the present disclosure is as follows.

(1) A wiring member according to the present disclosure is a wiring member including: a sheet material; and a wire-like transmission member extending on the sheet material and fixed to the sheet material by a contact area direct fixation at intervals in three or more positions in a longitudinal direction of the wire-like transmission member, wherein when an interval between two contact area direction fixation positions continuous in a longitudinal direction of the wire-like transmission member in contact area direction fixation positions of the sheet material and the wire-like transmission member is a fixation interval, the wiring member includes portions that differ in the fixation interval. The portions that differ in the fixation interval are formed in the wiring member in which the sheet material and the wire-like transmission member are fixed at intervals by the contact area direct fixation. Thus, the fixation interval is reduced in a portion where a high fixing strength is necessary and the fixation interval is increased in a portion where a high fixing strength is not necessary, thus an appropriate fixing strength can be obtained easily in each of the portions.

(2) A portion where the sheet material and the wire-like transmission member are fixed by a contact area direct fixation at a larger interval than the fixation interval in a portion on a terminal side of the wire-like transmission member may be located closer to a portion on an intermediate side than the portion on the terminal side. The wire-like transmission member is connected at a time of assembling the wiring member, thus the portion on the terminal side is grasped and moved more often than the portion on the intermediate side. Even in this case, the interval of the contact area direct fixation of the sheet material and the wire-like transmission member in the portion on the terminal side is small, thus the wire-like transmission member is hardly detached from the sheet material at the time of assembling in the portion on the terminal side.

(3) It is also applicable that a parallel assembled part assembled to be parallel to a peripheral member in a state of being assembled to a vehicle and an outer assembled part assembled extending away from the peripheral member are provided, and a portion where the sheet material and the wire-like transmission member are fixed by a contact area direct fixation at a larger interval than the fixation interval in the outer assembled part may be located in the parallel assembled part. The outer assembled part is influenced by vibration more easily than the parallel assembled part. Even in this case, the wire-like transmission member is hardly detached from the sheet material in the outer assembled part.

(4) It is also applicable that the wire-like transmission member has a bending part bending on the sheet material, and a portion where the sheet material and the wire-like transmission member are fixed by a contact area direct fixation at a larger interval than the fixation interval in the bending part is located away from the bending part. Accordingly, a deviation of the bending part of the wire-like transmission member from the sheet material can be suppressed.

(5) It is also applicable that in a state of being assembled to a vehicle, a bending assembled part in which a portion of the wire-like transmission member along a longitudinal direction is assembled toward a front and back direction of the sheet material in a bending state and a straight assembled part in which a portion of the wire-like transmission member along the longitudinal direction is assembled straight are provided, and a portion where the sheet material and the wire-like transmission member are fixed by a contact area direct fixation at a larger interval than the fixation interval in the bending assembled part is located in the straight assembled part. Accordingly, a deviation of the wire-like transmission member from the sheet material can be suppressed in the bending assembled part.

Details of Embodiment of Present Disclosure

Specific examples of a wiring member of the present disclosure are described hereinafter with reference to the drawings. The present invention is not limited to these examples, but is indicated by claims, and it is intended that meanings equivalent to claims and all modifications within a scope of claims are included.

First Embodiment

Figure 2:
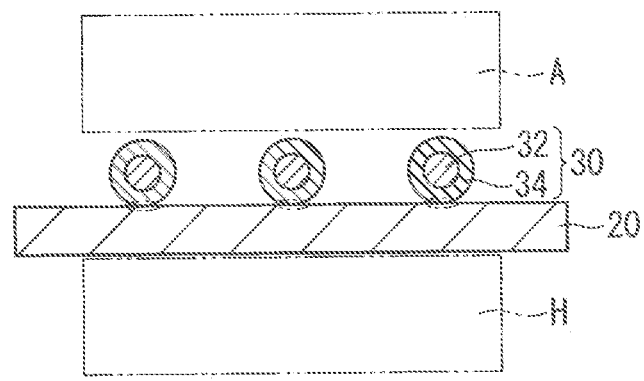
FIG. 2 is a cross-sectional view of the wiring member cut along a II-II line in FIG. 1.

A wiring member according to a first embodiment is described hereinafter. FIG. 1 is a plan view illustrating a wiring member 10 according to the first embodiment. FIG. 2 is a cross-sectional view of the wiring member cut along a II-II line in FIG. 1.

The wiring member 10 is a member joined to a component mounted to a vehicle to transmit electrical power and/or light to and/or from the component. The wiring member 10 includes a sheet material 20 and a wire-like transmission member 30 fixed on the sheet material 20. Herein, the plurality of wire-like transmission members 30 are fixed to the sheet material 20. Accordingly, the plurality of wire-like transmission members 30 are positioned.

A material constituting the sheet material 20 is not particularly limited, but may contain resin such as polyvinyl chloride (PVC), polyethylene (PE), polyethylene terephthalate (PET), polypropylene (PP), and polyamide (PA), for example, or may contain metal such as aluminum or copper. A structure of the sheet material 20 is not particularly limited, however, a fiber material having fibers such as a contexture, a knitting, and a non-woven cloth, for example, may be applicable, and a non-fiber material which does not have fibers such as a member made up by extrusion molding or injection molding may also be applicable. When the sheet material 20 is a non-fiber material made up by extrusion molding or injection molding, a foam made up by foam molding or a solid material which is not foam-molded but is uniformly solid may also be applicable.

The sheet material 20 may have a single layer or a plurality of layers. When the sheet material 20 has a plurality of layers, a material and a structure in each layer can be appropriately set. For example, the sheet material 20 may be made up of a resin layer and a resin layer overlapped with each other, a resin layer and a metal layer overlapped with each other, or a metal layer or a metal layer overlapped with each other. The sheet material 20 may be made up of a non-fiber material layer and a non-fiber material layer overlapped with each other, a non-fiber material layer and a fiber material layer overlapped with each other, or a fiber material layer and a fiber material layer overlapped with each other.

Herein, the sheet material 20 is formed into a shape in which a portion where the wire-like transmission member 30 is not disposed is notched, however, this configuration is not necessary. The sheet material 20 may have the other shape such as a trapezoidal shape, a parallelogram shape, or a quadrangular shape, for example. The sheet material 20 is preferably formed into a shape in accordance with a route of the wire-like transmission member 30.

It is sufficient that the wire-like transmission member 30 is a wire-like member transmitting electrical power or light. For example, the wire-like transmission member 30 may be a general wire having a core wire and a covering around the core wire, or may also be a bare conductive wire, a shielded wire, an enamel wire, a nichrome wire, or an optical fiber.

The wire-like transmission member 30 transmitting the electrical power may be various kinds of signal lines or various kinds of power lines. The wire-like transmission member 30 transmitting the electrical power may be used as an antenna or coil, for example, transmitting or receiving a signal or electrical power to or from a space.

The wire-like transmission member 30 is considered to include a transmission wire body 32 transmitting electrical power or light and a covering 34 covering the transmission wire body 32. When the wire-like transmission member 30 is a general wire, for example, the transmission wire body 32 corresponds to a core wire, and the covering 34 corresponds to the insulating covering. The core wire includes one or a plurality of strands. Each strand is formed of a conductive material such as copper, copper alloy, aluminum, and aluminum alloy, for example. When the core wire is made up of the plurality of strands, the plurality of strands are preferably stranded. The insulating covering is formed of a resin material such as PVC or PE extrusion-molded around the core wire.

In the example illustrated in FIG. 1, each end portion of the wire-like transmission member 30 is connected to a connector C. The connector C is connected to the other side connector provided in a component mounted to a vehicle and the other side connector provided on the end portion of the wire-like transmission member 30 extending from a component mounted to a vehicle. The end portion of the wire-like transmission member 30 may be connected to the other party of connection without an intervention of the connector C.

In the example illustrated in FIG. 1, the five wire-like transmission members 30 are provided, however, this configuration is not necessary. The number of the wire-like transmission members 30 may be one to four, or six or more, and can be appropriately set in accordance with the number of circuits of the wiring member 10. When the five wire-like transmission members 30 need to be distinguished from each other, they are referred to as the wire-like transmission members 30a, 30b, 30c, 30d, and 30e in some cases hereinafter.

In the example illustrated in FIG. 1, an intermediate portion of the wire-like transmission member 30 is fixed on the sheet material 20 and an end portion thereof extends to an outer side of the sheet material 20, however, this configuration is not necessary. The end portion of the wire-like transmission member 30 may also be located on the sheet material 20.

In the example illustrated in FIG. 1, the wire-like transmission members 30 extend in parallel to each other on the sheet material 20, however, this configuration is not necessary. The wire-like transmission members 30 may intersect with each other, for example. In the example illustrated in FIG. 1, the wire-like transmission member 30 is curved and disposed on the sheet material 20. Particularly, in the example illustrated in FIG. 1, a branch is formed. The configuration that the branch is formed and the wire-like transmission member 30 is curved and disposed is not necessary, however, the route of the wire-like transmission member 30 can be appropriately set.

The sheet material 20 and the wire-like transmission member 30 are fixed to each other by a contact area direct fixation. Herein, the contact area direct fixation indicates that the sheet material 20 and the wire-like transmission member 30 are directly stuck and fixed without an intervention of the adhesive agent, for example, which is separately provided. Considered in the contact area direct fixation is that resin included in at least one of the sheet material 20 and the wire-like transmission member 30 is melted, thus the sheet material 20 the wire-like transmission member 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the sheet material 20 and the wire-like transmission member 30 are in the state of the contact area direct fixation by these means. Specifically, when the state of the contact area direct fixation is formed by the ultrasonic welding, for example, the sheet material 20 and the wire-like transmission member 30 are in the state of the contact area direct fixation by the ultrasonic welding. A portion where the state of the contact area direct fixation by the heat is formed by the welding (a fixing portion between the sheet material 20 and the wire-like transmission member 30) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the contact area direct fixation, only the resin included in the sheet material 20 may be melted, or only the resin included in the wire-like transmission member 30 may be melted. In these cases, the resin which has been melted is stuck on an outer surface of the resin on the other side, and a relatively clear interface may be formed in some cases. In the contact area direct fixation, both the resin included in the sheet material 20 and the resin included in the wire-like transmission member 30 may be melted. In this case, there may be a case where both the resins are mixed and a clear interface is not formed. Particularly, when the sheet material 20 and the covering 34 of the wire-like transmission member 30 include compatible resin such as the same resin material, for example, there may be a case where both the resins are mixed and a clear interface is not be formed.

For example, when the sheet material 20 and the wire-like transmission member 30 are fixed by ultrasonic welding, it is considered that the sheet material 20 and the wire-like transmission member 30 are sandwiched between a horn H and an anvil A, which are a ultrasonic welding machine, and ultrasonic vibration is provided by the horn H. A material of at least one of the sheet material 20 and the wire-like transmission member 30 is melted by frictional heat generated in an interface between the sheet material 20 and the wire-like transmission member 30, thus the sheet material 20 and the wire-like transmission member 30 are fixed to each other. At this time, FIG. 2 illustrates the example that the sheet material 20 and the wire-like transmission member 30 are sandwiched between the horn H and the anvil A of the ultrasonic welding machine to be ultrasonic-welded.

In the contact area direct fixation of the sheet material 20 and the wire-like transmission member 30, the wire-like transmission member 30 is fixed to the sheet material 20 by a contact area direct fixation at intervals in three or more positions in a longitudinal direction of the wire-like transmission member 30. Each contact area direct fixation position of each sheet material 20 and wire-like transmission member 30 is referred to as a spot fixing part in some cases hereinafter. The spot fixing part may be sequentially formed one by one for one wire-like transmission member 30, or a plurality of spot fixing parts 50 may also be formed at the same time.

In each drawing, a code 50 indicates a position where the spot fixing part is formed. In the description hereinafter, the spot fixing part is marked with this code 50, and referred to as the spot fixing part 50. Herein, in each drawing, the spot fixing part 50 has a circular shape for a purpose of convenience, however, the shape of the spot fixing part 50 does not necessarily have the circular shape. In each drawing, the spot fixing part 50 is formed to have a similar size (range) for a purpose of convenience, however, the spot fixing part 50 having a different size (range) may also be formed.

An interval between two contact area direct fixation positions continuous in the longitudinal direction of the wire-like transmission member 30 in the contact area direct fixation positions (spot fixing parts 50) of the sheet material 20 and the wire-like transmission member 30 is defined as a fixation interval D.

The wiring member 10 has portions with different fixation intervals D. Herein, a portion with a small fixation interval D in the portions with the different fixation intervals D is a portion in which a fixing strength of the sheet material 20 and the wire-like transmission member 30 is intended to be increased. A portion with a large fixation interval D in the portions with the different fixation intervals D is a portion in which a large fixing strength of the sheet material 20 and the wire-like transmission member 30 is not necessary. The fixation interval D is increased, thus the number of spot fixing parts 50 is reduced, and a time for manufacturing the wiring member 10 is reduced.

In the description herein, the fixing strength of each spot fixing part 50 is the same. Accordingly, the fixing strength of the sheet material 20 and the wire-like transmission member 30 mainly depends on the fixation interval D of the spot fixing part 50. The spot fixing part 50 with the different fixing strength may also be formed. Particularly, it is also considered that the fixing strength of the spot fixing part 50 in a portion in which a high fixing strength is necessary such as a portion with a small fixing interval D is set larger than the fixing strength of the spot fixing part 50 in a portion in which a high fixing strength is not necessary. In order to increase the fixing strength of the spot fixing part 50, it is considered that energy supplied in forming the spot fixing part 50 is increased by increasing energy supplied per unit time or increasing a time of supplying the energy, for example.

Herein, there are portions where the fixation intervals D differ in a terminal side part 36 and an intermediate side part 38 of the wire-like transmission member 30. Specifically, there is a portion, in the intermediate side part 38 rather than the terminal side part 36, where the sheet material 20 and the wire-like transmission member 30 are fixed by a contact area direct fixation at a larger interval than a fixation interval D1 in the terminal side part 36 of the wire-like transmission member 30.

In the description, the fixation interval D1 of the terminal side part 36 to be compared is the fixation interval D located closest to the terminal side. It is also considered that as the fixation interval D1 of the terminal side part 36, an average value of the fixation interval D located closest to the terminal side and the adjacent fixation interval D is set, or a minimum value in the fixation interval D closest to the terminal side or the adjacent fixation interval D is set.

In the description, a fixation interval D2 of the intermediate side part 38 to be compared is at least one fixation interval D2 in the intermediate side part 38 having a maximum value.

Any of one terminal side part 36 and the other terminal side part 36 is applicable as the terminal side part 36 to be compared, the terminal side part with a smaller fixation interval D is considered to be applied, for example. That is to say, it is sufficient that there is the portion where the sheet material 20 and the wire-like transmission member 30 are fixed by the contact area direct fixation at the larger interval than the fixation interval D1 in one or the other terminal side part 36 in the intermediate side part 38 rather than the terminal side part 36. As a matter of course, there may be the portion where the sheet material 20 and the wire-like transmission member 30 are fixed by the contact area direct fixation at the larger interval than the fixation intervals D1 in both terminal side parts 36 in the intermediate side part 38 rather than the terminal side part 36.

More specifically, in the example illustrated in FIG. 1, both terminal side parts 36 are formed at the similar fixation interval D1 in a wire-like transmission member 30a. At this time, the fixation interval D2 in the intermediate side part 38 is set larger than the fixation interval D1 in both terminal side parts 36 in the wire-like transmission member 30a. The same applies to the wire-like transmission members 30b, 30c, 30d, and 30e.

A parallel assembled part 12 and an outer assembled part 14 are provided in the wiring member 10. The parallel assembled part 12 and the outer assembled part 14 are portions each having an assembling state different from each other in a state where the wiring member 10 is assembled to a vehicle. The parallel assembled part 12 and the outer assembled part 14 are continuously located.

More specifically, the parallel assembled part 12 is a portion assembled to be in parallel to a peripheral member 80 in a state where the wiring member 10 is assembled to a vehicle. In contrast, the outer assembled part 14 is a portion assembled extending away from the peripheral member 80 in the state where the wiring member 10 is assembled to the vehicle. In the example illustrated in FIG. 1, a reinforcement is adopted as the peripheral member 80. Also considered as the peripheral member 80 are various panels, trims, and pillars besides the reinforcement. The parallel assembled part 12 may be or may not be fixed to the peripheral member 80 in some cases. When the parallel assembled part 12 is fixed to the peripheral member 80, the peripheral member 80 can be also considered a fixing target member.

Herein, there are portions where the fixation intervals D differ in the parallel assembled part 12 and the outer assembled part 14. Specifically, there is a portion, in the parallel assembled part 12, where the sheet material 20 and the wire-like transmission member 30 are fixed by a contact area direct fixation at a larger interval than a fixation interval D3 in the outer assembled part 14.

In the description, the fixation interval D3 of the outer assembled part 14 to be compared is the smallest fixation interval D in the outer assembled part 14. Also considered is that the fixation interval D3 of the outer assembled part 14 to be compared is an average value of the plurality of fixation intervals D in the outer assembled part 14.

In the description, a fixation interval D4 of the parallel assembled part 12 to be compared is a maximum value in at least one fixation interval D in the parallel assembled part 12.

When there is the plurality of outer assembled parts 14, it is sufficient that there is a portion where the sheet material 20 and the wire-like transmission member 30 are fixed by a contact area direct fixation at a larger interval than a fixation interval D3 in some of the outer assembled parts 14. There is preferably a portion, in the parallel assembled part 12, where the sheet material 20 and the wire-like transmission member 30 are fixed by a contact area direct fixation at a larger interval than the fixation interval D3 in all of the outer assembled part 14.

More specifically, in the example illustrated in FIG. 1, the portion in the wiring member 10 including an end portion side part of each wire-like transmission member 30 is the outer assembled part 14 and a portion therebetween is the parallel assembled part 12. The fixation interval D3 in each outer assembled part 14 is formed in the similar manner. At this time, in the wire-like transmission members 30a, 30b, 30c, 30d, and 30e, the fixation interval D4 in the parallel assembled part 12 is set larger than the fixation interval D3 in the outer assembled part 14.

The wire-like transmission member 30 includes a bending part 40 bending on the sheet material 20.

Herein, there is a portion, in a portion away from the bending part 40, where the sheet material 20 and the wire-like transmission member 30 are fixed by a contact area direct fixation at a larger interval than a fixation interval D5 in the bending part 40. The wire-like transmission member 30 includes a straight part 42 extending straight on the sheet material 20. Herein, there is a portion, in the straight part 42, where the sheet material 20 and the wire-like transmission member 30 are fixed by a contact area direct fixation at a larger interval than the fixation interval D5 in the bending part 40.

Herein, the fixation interval D5 in the bending part 40 indicates an interval between two spot fixing parts 50 with the bending part 40 therebetween. For example, when the spot fixing part 50 is located in the bending part 40, an interval between the spot fixing part 50 located in the bending part 40 and the spot fixing part 50 continuous therewith can be the fixation interval D5 in the bending part 40. In this case, there are the plurality of fixation intervals D in the bending part 40. Specifically, a portion from the parallel assembled part 12 toward the outer assembled part 14 is defined as the bending part 40 in the wire-like transmission member 30a, for example. At this time, there is one spot fixing part 50 in the bending part 40. Thus, each interval between the spot fixing part 50 and the spot fixing parts 50 continuous therewith on both sides can be the fixation interval D5 in the bending part 40. When there is no spot fixing part 50 in the bending part 40, an interval between two spot fixing parts 50 formed in positions closest to the bending part 40 and sandwiching the bending part 40 is the fixation interval D5 in the bending part 40. In this case, there is only one fixation interval D5 in the bending part 40. Specifically, a portion from the parallel assembled part 12 toward the outer assembled part 14 is defined as the bending part 40 in the wire-like transmission member 30d, for example. At this time, there is no spot fixing part 50 in the bending part 40 in the wire-like transmission member 30d. Thus, an interval between two spot fixing parts 50 with the bending part 40 therebetween is defined as the fixation interval D5 in the bending part 40 in the wire-like transmission member 30d.

In the description, the fixation interval D5 of the bending part 40 to be compared is the smallest fixation interval D in the bending part 40. Also considered is that the fixation interval D5 of the bending part 40 to be compared is an average value of the plurality of fixation intervals D5 in the bending part 40.

In the description, a fixation interval D6 of the straight part 42 to be compared is a maximum value in at least one fixation interval D in the straight part 42.

More specifically, in the example illustrated in FIG. 1, the fixation interval D6 in the straight part 42 is set larger than the fixation interval D5 in the bending part 40 in the wire-like transmission member 30u. The same applies to the wire-like transmission members 30b, 30c, 30d, and 30e.

When there is the plurality of bending parts 40, it is sufficient that there is a portion, in the straight part 42, where the sheet material 20 and the wire-like transmission member 30 are fixed by a contact area direct fixation at a larger interval than the fixation interval D5 in some of the bending parts 40. There is preferably a portion, in the straight part 42, where the sheet material 20 and the wire-like transmission member 30 are fixed by a contact area direct fixation at a larger interval than the fixation interval D5 in all of the bending parts 40.

In the example illustrated in FIG. 1, the spot fixing parts 50 are formed in adjacent positions of the plurality of wire-like transmission members 30 extending in parallel to each other in the wiring member 10. Such a wiring member 10 is formed by collectively fixing the plurality of wire-like transmission members 30 extending in parallel to each other when one spot fixing part 50 is fixed, for example. For example, FIG. 2 illustrates an example that ultrasonic vibration is supplied in a state where the sheet material 20 and the plurality of wire-like transmission members 30 are sandwiched between the horn H and the anvil A, thus the spot fixing parts 50 are collectively formed in the adjacent positions of the plurality of wire-like transmission members 30 extending in parallel to each other.

According to the wiring member 10 having the above configuration, the portion where the fixed interval D differs is formed in the wiring member 10 in which the sheet material 20 and the wire-like transmission member 30 are fixed at intervals by the contact area direct fixation. Thus, the fixation interval D is reduced in a portion where a high fixing strength is necessary and the fixation interval D is increased in a portion where a high fixing strength is not necessary, thus an appropriate fixing strength can be obtained easily in each portion.

Herein, when the sheet material and the wire-like transmission member are wholly welded in one heating-pressurizing process, control of a partial fixing state is hardly performed. Specifically, in a case where there are both a portion where a high fixing strength is necessary and a portion where a high fixing strength is not necessary in the wiring member, if the heating-pressurizing welding is performed under conditions being set in accordance with the portion where the high fixing strength is necessary, there is a possibility that an excessive quality is obtained in the portion where the high fixing strength is not necessary. If the conditions are inappropriately set, there is a possibility that a fixation unevenness occurs and a sufficient fixing strength cannot be obtained in the portion where the high fixing strength is necessary.

In contrast, in the wiring member 10 described above, the sheet material 20 and the wire-like transmission member 30 are fixed by the contact area direct fixation at intervals, thus control of a fixing state in each portion can be performed easily compared with a case where they are wholly fixed in a contact area direct fixation. Specifically, the spot fixing part 50 is formed in a small range compared with the case where the sheet material 20 and the wire-like transmission member 30 are wholly fixed in the contact area direct fixation, thus conditions on one spot fixing part 50 is easily set, and a fixation unevenness hardly occurs, for example. Accordingly, an appropriate fixing strength can be easily obtained in each portion.

The wire-like transmission member 30 is connected at the time of assembling the wiring member 10, thus the terminal side part 36 is grasped and moved more often than the intermediate side part 38. As described above, the fixation interval D1 of the terminal side part 36, which is handled frequently with a large force until assembling the wiring member 10 to a vehicle after manufacture, is relatively small, thus the wire-like transmission member 30 is hardly detached from the sheet material 20 in the terminal side part 36 at the time of assembly, for example.

The outer assembled part 14 extends away from the peripheral member 80, thus is influenced by vibration more easily than the parallel assembled part 12. Even in this case, the fixation interval D3 in the outer assembled part 14 is relatively small in the wiring member 10 described above, thus the wire-like transmission member 30 in the outer assembled part 14 is hardly detached from the sheet material 20.

There is a possibility that a loosening of the wire-like transmission member 30 occurs in the bending part 40, and the wire-like transmission member 30 deviates from the sheet material 20 due to the loosening. Even in this case, the fixation interval D5 in the bending part 10 is relatively small in the wiring member 10 described above, thus deviation of the bending part 40 of the wire-like transmission member 30 from the sheet material 20 can be suppressed.

Second Embodiment

Figure 3:
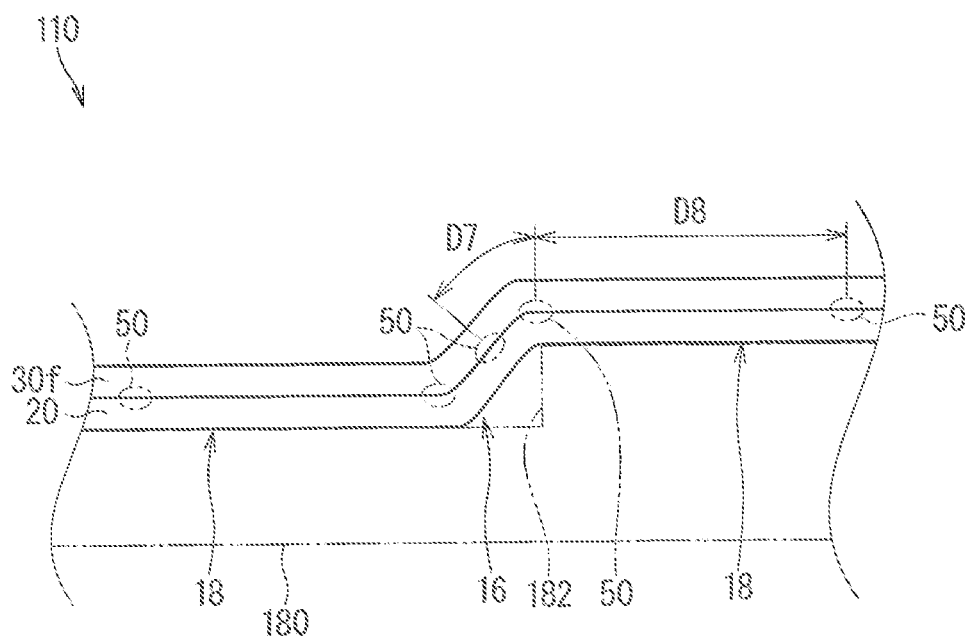
FIG. 3 is a side view illustrating a wiring member according to a second embodiment.

A wiring member according to a second embodiment is described. FIG. 3 is a side view illustrating a wiring member 110 according to the second embodiment. In the description of the present embodiment, the same reference numerals are assigned to the similar constituent elements described above, and the description thereof will be omitted.

A bending assembled part 16 and a straight assembled part 18 are provided in the wiring member 110. The bending assembled part 16 and the straight assembled part 18 are portions each having an assembling state different from each other in a state where the wiring member 110 is assembled to a vehicle. The bending assembled part 16 and the straight assembled part 18 are continuously located.

More specifically, the bending assembled part 16 is a portion of the wire-like transmission member 30 along the longitudinal direction assembled toward a front and back direction of the sheet material 20 in a bending state in a state where the wiring member 110 is assembled to a vehicle.

The straight assembled part 18 is a portion of the wire-like transmission member 30 along the longitudinal direction assembled straight in the state where the wiring member 110 is assembled to the vehicle. The straight assembled part 18 is also considered a portion which is not the bending assembled part 16, that is to say, a portion of the wire-like transmission member 30 along the longitudinal direction which is assembled so as not to bend toward the front and back direction of the sheet material 20 in the state where the wiring member 110 is assembled to the vehicle.

Figure 4:
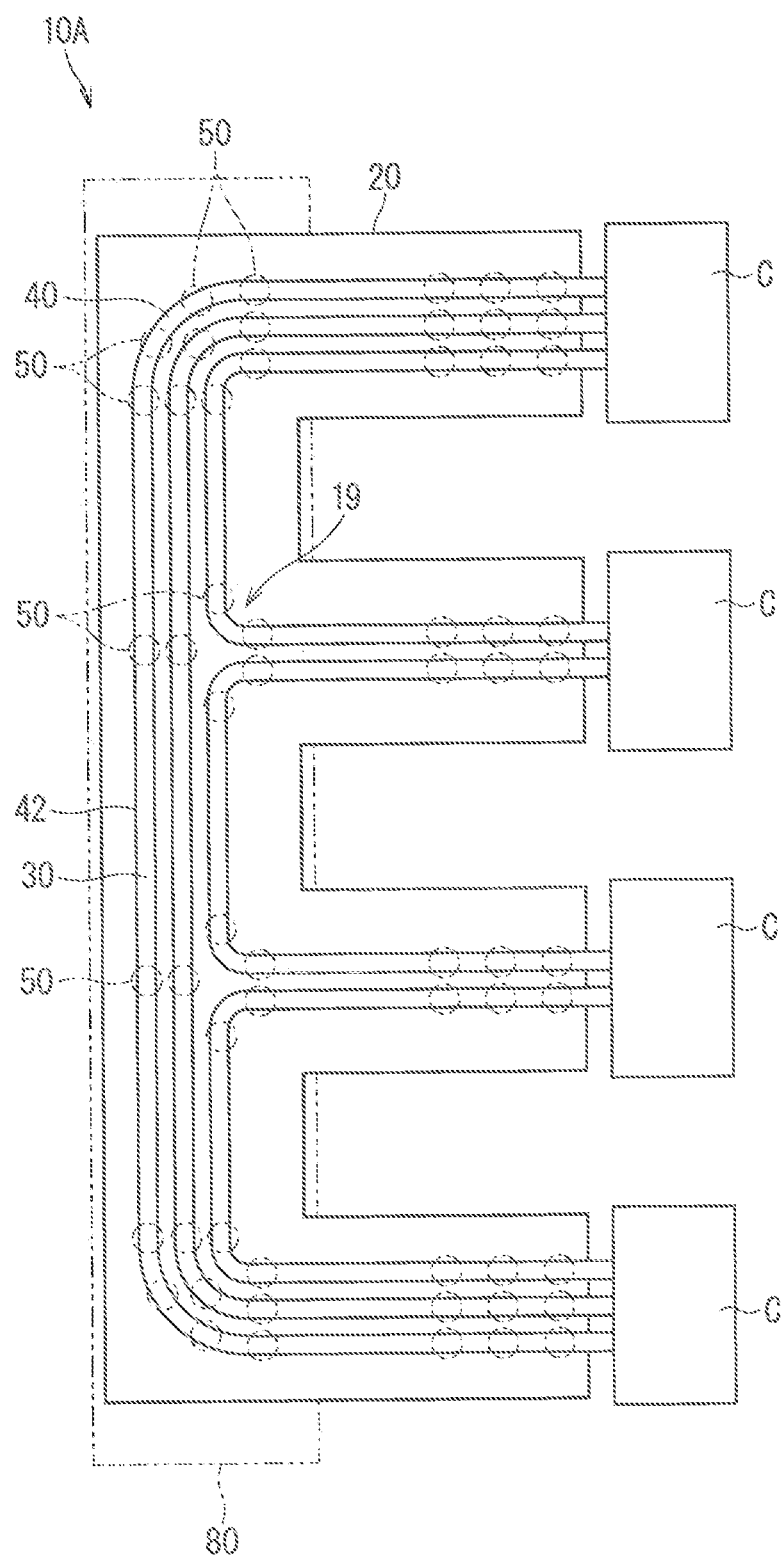
FIG. 4 is a plan view illustrating modification example of the wiring member according to the first embodiment.

In the example illustrated in FIG. 4, the wiring member 110 is assembled along the peripheral member 180 to form the bending assembled part 16 and the straight assembled part 18. Specifically, a level difference 182 occurs in the peripheral member 180. The wiring member 110 is assembled to the peripheral member 180 in such a manner that a portion of the wire-like transmission member 30 along the longitudinal direction passes over the level difference 182. Accordingly, the portion of the wiring member 110 passing over the level difference 182 constitutes the bending assembled part 16, and the portion extending away from the level difference 182, that is to say, the portion thereof before or after passing over the level difference 182 constitutes the straight assembled part 18.

As a matter of course, the bending assembled part 16 and the straight assembled part 18 are also considered to be generated in the wiring member 110 in a case other than that described above. For example, the bending assembled part 16 and the straight assembled part 18 may be generated when the wiring member 110 is bent and a route regulation member is attached to the bent part or when the wiring member 110 along the longitudinal direction are fixed at two positions to different components and a portion between the two positions are bent.

It is preferable that in the bending assembled part 16 and the straight assembled part 18, the wire-like transmission member 30 extends straight on the sheet material 20 before assembling. In other words, it is preferable that a portion of the wire-like transmission member 30 disposed straight on the flat sheet material 20 is assembled in a bending state toward the front and back direction of the sheet material 20 to constitute the bending assembled part 16 and the straight assembled part 18. As a matter of course, it is also applicable that a portion of the wire-like transmission member 30 bent and disposed on the flat sheet material 20 is assembled in a bending state toward the front and back direction of the sheet material 20 to constitute the bending assembled part 16 and the straight assembled part 18.

Herein, there are portions where the fixation intervals D differ in the bending assembled part 16 and the straight assembled part 18. Specifically, there is a portion, in the straight assembled part 18, where the sheet material 20 and the wire-like transmission member 30 are fixed by a contact area direct fixation at a larger interval than the fixation interval D7 in the bending assembled part 16.

Herein, the fixation interval D7 in the bending assembled part 16 indicates an interval between two spot fixing parts 50 with the bending assembled part 16 therebetween. For example, when the spot fixing part 50 is located in the bending assembled part 16, an interval between the spot fixing part 50 located in the bending assembled part 16 and the spot fixing part 50 continuous therewith can be the fixation interval D7 in the bending assembled part 16. In this case, there are the plurality of fixation intervals D in the bending assembled part 16. Specifically, a portion of the wire-like transmission member 30f passing over the level difference 182 constitutes the bending assembled part 16. At this time, there is one spot fixing part 50 in the bending assembled part 16. Thus, each interval between the spot fixing part 50 and the spot fixing parts 50 continuous therewith on both sides can be the fixation interval D7 in the bending assembled part 16. When there is no spot fixing part 50 in the bending assembled part 16, an interval between two spot fixing parts 50 formed in positions closest to the bending assembled part 16 and sandwiching the bending assembled part 16 is the fixation interval D7 in the bending assembled part 16. In this case, there is only one fixation interval D7 in the bending part 40.

In the description, the fixation interval D7 of the bending assembled part 16 to be compared is the smallest fixation interval D in the bending assembled part 16. Also considered is that the fixation interval D7 of the bending assembled part 16 to be compared is an average value of the plurality of fixation intervals D in the bending assembled part 16.

In the description, a fixation interval D8 of the straight assembled part 18 to be compared is a maximum value in at least one fixation interval D in the straight assembled part 18.

More specifically, in the example illustrated in FIG. 3, the fixation interval D8 in the straight assembled part 18 is set larger than the fixation interval D7 in the bending assembled part 16 in the wire-like transmission member 30f.

When there is the plurality of bending assembled parts 16, it is sufficient that there is a portion, in the straight assembled part 18, where the sheet material 20 and the wire-like transmission member 30 are fixed by a contact area direct fixation at a larger interval than the fixation interval D7 in some of the bending assembled parts 16. There is preferably a portion, in the straight assembled part 18, where the sheet material 20 and the wire-like transmission member 30 are fixed by a contact area direct fixation at a larger interval than the fixation interval D7 in all of the bending assembled parts 16.

In the bending assembled part 16, a part of the wire-like transmission member 30 along the longitudinal direction is bent in the front and back direction of the sheet material 20, thus the wire-like transmission member 30 tends to be deviated from the sheet material 20. Even in this case, the fixation interval D7 in the bending assembled part 16 is relatively small according to the wiring member 110 described above, thus deviation of the wire-like transmission member 30 from the sheet material 20 can be suppressed in the bending assembled part 16.

Modification Example

FIG. 4 is a plan view illustrating a modification example of the wiring member 10 according to the first embodiment.

In the above description, the spot fixing part 50 is formed in the adjacent positions of the plurality of wire-like transmission members 30 extending in parallel to each other, however, this configuration is not necessary. The position where the spot fixing part 50 is formed may be set for each wire-like transmission member 30. For example, the position where the spot fixing part 50 is formed can be set for each wire-like transmission member 30 by supplying ultrasonic vibration in the state where the horn H and the anvil A sandwich the sheet material 20 and one wire-like transmission member 30. When the spot fixing part 50 is appropriately formed for each wire-like transmission member 30 as described above, there is a case where the spot fixing parts 50 are formed in different positions in the wire-like transmission members 30 extending in parallel to each other as with a wiring member 10A illustrated in FIG. 4.

Specifically, in the example illustrated in FIG. 4, the spot fixing parts 50 are formed in different positions in the wire-like transmission members 30 extending in parallel to each other in the bending part 40 and the straight part 42. In the example illustrated in FIG. 4, it can also be considered that the spot fixing parts 50 are formed in different positions in the wire-like transmission members 30 extending in parallel to each other in a branch part 19.

In the first embodiment, there are the difference between the fixation interval D1 of the terminal side part 36 and the fixation interval D2 of the intermediate side part 38, the difference between the fixation interval D3 of the parallel assembled part 12 and the fixation interval D4 of the outer assembled part 14, and the difference of the fixation interval D5 of the bending part 40 and the fixation interval D6 of the straight part 42 together, however, one or two of them may be omitted. There may be the difference between the fixation interval D7 of the bending assembled part 16 and the fixation interval D8 of the straight assembled part 18 in the second embodiment and one or a plurality of the three differences of the fixation intervals described above (the difference between D1 and D2, the difference between D3 and D4, or the difference between D5 and D6) in the first embodiment together.

In the example described above, the diameter of the plurality of wire-like transmission members 30 is the same, however, one wiring member 10 may include the wire-like transmission members 30 having different diameters.

The configurations described in the embodiments and modification examples thereof can be appropriately combined as long as they are not contradictory.

EXPLANATION OF REFERENCE SIGNS

- 10 wiring member
- 12 parallel assembled part
- 14 outer assembled part
- 16 bending assembled part
- 18 straight assembled part
- 20 sheet material
- 30 wire-like transmission member
- 32 transmission wire body
- 34 covering
- 36 terminal side part
- 38 intermediate side part
- 40 bending part
- 42 straight part
- 50 spot fixing part
- 80 peripheral member
- D, D1 to D8 fixation interval
- C connector

The invention claimed is:

1. A wiring member, comprising:

a flat sheet member; and a wire-like transmission member extending on the sheet material and fixed to the sheet material by a contact area direct fixation at intervals in three or more positions in a longitudinal direction of the wire-like transmission member, wherein when an interval between two contact area direct fixation positions continuous in a longitudinal direction of the wire-like transmission member in a contact area direct fixation position of the sheet material and the wire-like transmission member is a fixation interval, the wiring member includes portions that differ in the fixation interval, a portion of the wire-like transmission member including a terminal side portion on one terminal side of the wire-like transmission member constitutes a straight part extending straight, a portion of the sheet material where the straight part is disposed is formed straight corresponding to the straight part, and a portion where the sheet material and the wire-like transmission member are fixed by a contact area direct fixation at a larger interval than the fixation interval on a side closest to the terminal in the straight part is located in the straight part.

2. The wiring member according to claim 1, wherein the wire-like transmission member includes a bending part bending on the sheet material, and a portion where the sheet material and the wire-like transmission member are fixed by a contact area direct fixation at a larger interval than the fixation interval in the bending part is located away from the bending part.

3. The wiring member according to claim 1, wherein in a state of being assembled to a vehicle, a bending assembled part in which a portion of the wire-like transmission member along a longitudinal direction is assembled toward a front and back direction of the sheet material in a bending state and a straight assembled part in which a portion of the wire-like transmission member along the longitudinal direction is assembled straight are provided, and a portion where the sheet material and the wire-like transmission member are fixed by a contact area direct fixation at a larger interval than the fixation interval in the bending assembled part is located in the straight assembled part.

4. A wiring member, comprising:

a sheet material; and a wire-like transmission member extending on the sheet material and fixed to the sheet material by a contact area direct fixation at intervals in three or more positions in a longitudinal direction of the wire-like transmission member, wherein when an interval between two contact area direct fixation positions continuous in a longitudinal direction of the wire-like transmission member in a contact area direct fixation position of the sheet material and the wire-like transmission member is a fixation interval, the wiring member includes portions that differ in the fixation interval, a parallel assembled part assembled to be parallel to a peripheral member in a state of being assembled to a vehicle and an outer assembled part assembled extending away from the peripheral member are provided, and a portion where the sheet material and the wire-like transmission member are fixed by a contact area direct fixation at a larger interval than the fixation interval in the outer assembled part is located in the parallel assembled part.

* * * * *